United States Patent [19]
Bergin

[11] Patent Number: 5,267,412
[45] Date of Patent: Dec. 7, 1993

[54] INDOOR WATERING DEVICE

[76] Inventor: Kathleen T. Bergin, 1260 Vestal Ave., Binghamton, N.Y. 13903

[21] Appl. No.: 980,295

[22] Filed: Nov. 23, 1992

[51] Int. Cl.$^5$ .............................................. A01G 29/00
[52] U.S. Cl. ......................................... 47/48.5; 47/79
[58] Field of Search ............... 47/79, 59, 62, 48.5, 47/40.5

[56] References Cited

U.S. PATENT DOCUMENTS

| | | | |
|---|---|---|---|
| 2,809,468 | 10/1957 | Eliot | 47/48.5 |
| 2,990,647 | 7/1961 | Himebaugh | 47/47 L |
| 3,142,935 | 8/1964 | Campos | 47/47 R |

FOREIGN PATENT DOCUMENTS

| | | | |
|---|---|---|---|
| 949135 | 9/1956 | Fed. Rep. of Germany | 47/79 |
| 3439427 | 5/1986 | Fed. Rep. of Germany | 47/79 |

Primary Examiner—Ramon S. Britts
Assistant Examiner—Joanne C. Downs
Attorney, Agent, or Firm—Salzman & Levy

[57] ABSTRACT

An indoor watering device is described as having a water collecting means from a source such as a watering can or tube and means to direct water from the collecting means to a selected destination. A preselected camouflage is a part of the indoor watering device and is either detachably supported by the water collecting means or is attached to a support for the indoor watering device for detachably support the water collecting means. The indoor watering device provides a neat, convenient and controlled way of directing water from a supply to an otherwise inconvenient and inaccessible destination, such as to receptacle supporting a Christmas tree or to a remotely positioned pot of house plants.

2 Claims, 1 Drawing Sheet

INDOOR WATERING DEVICE

BACKGROUND OF THE INVENTION

The present invention, generally, relates to devices for furnishing water, as it is received, to a desired location in a controlled manner and, more particularly, to a device to do this function while being camouflaged as a different object.

While the watering device of the present invention is termed an "indoor" device, it is understood that this term identifies any area where the act of watering an object could be objectionable for any number of reasons. For example, on a patio or an open porch, the act of watering potted plants that are somewhat inaccessible can result in spillage which can cause an unsightly mess and can cause water damage to other objects, such as rugs.

Therefore, it is understood that the term "indoor" does not necessarily refer to inside an enclosure, such as a house, but it identifies any area where water spillage can produce results that are objectionable and where it can cause an unsightly condition. The device of the present invention permits controlling the water as it is being furnished to an object, whether it is the act of watering potted plants, small potted trees or furnishing water to the base of a Christmas tree.

OBJECTS AND SUMMARY OF THE INVENTION

It is an important object of the present invention to provide a device to control a liquid that is intended for delivery to a specific area, which device includes a predetermined camouflage.

Another object of the invention is to provide a device to direct a liquid, such as water, in a controlled manner to a preselected destination, while the device is camouflaged as a different identity.

Briefly, the present invention is a device for controlling a liquid, such as water, and for directing the liquid in a neat and orderly manner to a preselected destination, such as into a potted plant or into a receptacle at the base of a tree. The device includes a portion for receiving a supply of the liquid and a portion for directing the liquid to its destination. A support is included for fixing the device in a predetermined position relative to the destination of the liquid, and also, a camouflage is included, particularly to render the liquid receiving portion to appear to an observer as a completely different object.

DETAILED DESCRIPTION OF THE INVENTION

Figure 1:
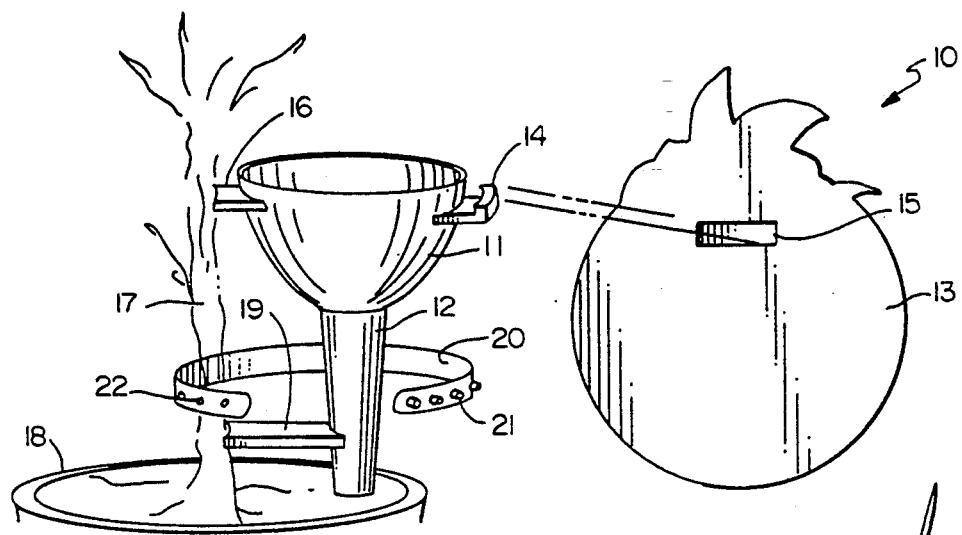
FIG. 1 is an exploded view in perspective illustrating the device of the invention as an aid in a detailed description to follow.

In FIG. 1 of the drawings, Which illustrates the device 10 of the invention generally, a portion of the device 10 that is arranged to receive a liquid, such as water, is identified by the numeral 11, and the portion that is arranged to convey that liquid is identified by the numeral 12. It is anticipated that the device 1? will be most useful in conveying water to potted plants in a house or for conveying water to maintain the fresh condition of a Christmas tree, particularly when a potted plant or Christmas tree holder is not readily accessible.

It is anticipated also that the portions 11 and 12 can be formed by an ordinary funnel, but the invention is not limited to that structure. Since water is carried within a home in an ordinary watering can to water house plants, some of which are not readily accessible, any structural configuration that is formed to receive such water quickly, easily and in relatively large quantities will fulfill the functional requirements of the present invention, as illustrated by the device 10.

For example, by taking marketing factors into consideration, it may be deemed more desirable to form the water receiving portion 11 in a more unusual configuration, such as square or flared or the like. Also, the water conveying and directing portion 12 can readily be formed as illustrated by the arrangement in FIG. 3, which will be described in more detail presently.

Figure 2:
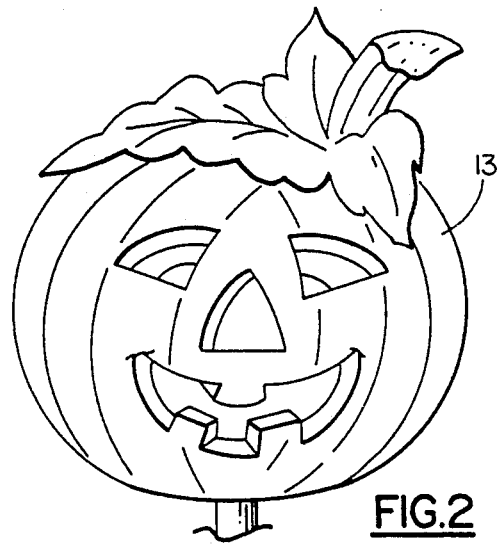
FIG. 2 is a front view of one form of camouflage to which the present invention is adapted to be functional.

Since any configuration for the device 10 may be considered strange, when depicted in the environment of a house plant, an important aspect of the device 10 of the present invention is the camouflage 13 that is changeable to fit a variety of occasions. In FIG. 1, the camouflage 13 is shown as the reverse or the back of that shown in FIG. 2, which would be appropriate for late in October, particularly when children are in the home.

The water receiving portion 11 of the device 10, therefore, is formed with a hook 14 to be engaged by a loop 15 of any suitable arrangement to attach and support the camouflage 13. On the opposite side of the water receiving portion 11 of the device 10, a projection 16 is formed of a pre-calculated length to engage the stalk or the trunk, identified by the numeral 17, of a Christmas tree or a small house tree in a pot 18.

The length of a second projection 19 is pre-calculated also so that when engaging the stalk or trunk 17, the device 10 will be fixed in a generally upright condition with the water conveying portion 12 positioned to direct the flow of water from the water receiving portion 11 to a desired destination, such as, for example, to a Christmas tree holding receptacle or to a pot, as identified by the numeral 18.

It should be noted further that the ends of each of the projections 16 and 19 are concave in configuration to avoid an otherwise tendency to slip while engaging the stalk or trunk 17. Also, the length of each projection 16 and 19 will be determined by the particular point along the length of each respective portion 11 and 12 that each is attached to extend.

For example, if the projection 16 extends from the water receiving portion 11 at a point further down, as viewed in FIG. 1, the projection 16 must necessarily be longer in order that the uppermost rim of the water receiving portion 11 will not touch the stalk or trunk 17. As a further example, when the water conveying portion 12 is arranged as seen in FIG. 3, the projection 19 can readily be from a point closer to the water receiving portion 11.

The device 10 is attached in its functioning position relative to the stalk or trunk 17 by a strap 20 of a width that will avoid its cutting into the stalk or trunk 17. Such a strap 20 is attached by any suitable means, such as hook and loop fasteners or preferably by knobs 21 to be received in holes 22.

Figure 3:
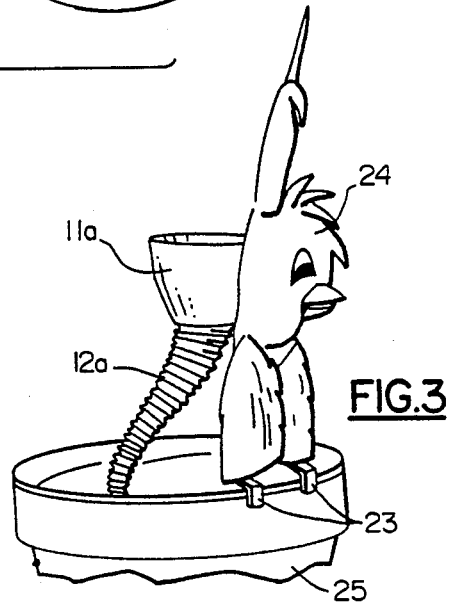
FIG. 3 is a view in perspective illustrating another means for fixing and supporting the device of the invention and a modification for directing a liquid to its destination.

FIG. 3 illustrates a modification to which the device 10 of the invention is adaptable. That is, instead of a strap 20, FIG. 1, at least one and preferably two clips 23 support the device 10 by attaching a camouflage 24 to the edge of a pot 25. In this view, the water receiving portion is of a different configuration and is identified by the numeral 11a, and the water conveying portion is a different configuration and is identified by the reference numeral 12a.

While it is not visible in FIG. 3, it will be understood that a hook, like the hook 14 in FIG. 1, is reversed to be received in a loop, like the loop 15 in FIG. 1, because in the arrangement illustrated in FIG. 3, the camouflage provides the actual support for the device 10.

Figure 4:
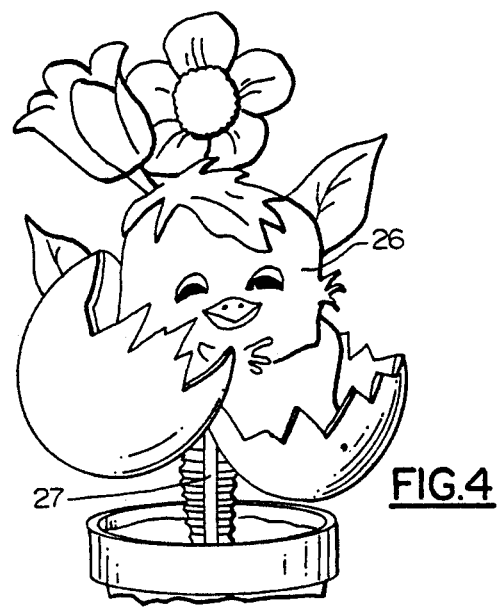
FIG. 4 is a view like FIG. 2 illustrating a different form of a camouflage to which the invention is adapted to be functional.

A still further modification of the arrangement in accordance with the invention is illustrated in FIG. 4 of the drawings. In this figure, a camouflage 26, which is different and more appropriate for Easter, is supported by a single stick that is identified by the numeral 27.

With an arrangement as illustrated in FIG. 4, the single stick 27 is embedded in the soil of the flower pot, and with a hook and loop fastener in the configuration opposite that of FIG. 1, but as described in connection with FIG. 3, the camouflage 26 supports a water receiving portion and a water conveying portion.

Figure 5:
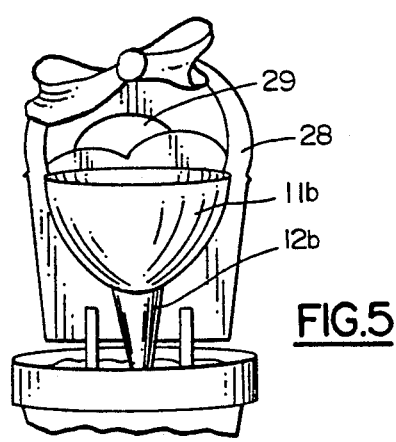
FIG. 5 is a view from the back illustrating the device of the invention behind its camouflage and showing its support.

In FIG. 5, a camouflage 28 is shown from the reverse, and it is clear that it is the camouflage that provides support for the portions 11b and 12b. However, in this arrangement, the camouflage 28 has an opening 29 to permit access from the front to the water receiving portion 11b by a spout of a watering can or a watering tube or the like.

While the invention has been described and illustrated with reference to a presently preferred embodiment, identifying several modifications to which it is adaptable, it is understood that one skilled in this art, having the foregoing description before him, will be able to make still further modifications and changes, but it is understood also that the present invention is not limited to the described embodiments or modifications, but rather, the invention is limited only by the scope of the appended claims.

What is claimed is:

1. An indoor watering device for controlling water and directing it in a neat and orderly manner to a preselected destination, comprising:

water collecting means formed of substantially rigid material for receiving a supply of water, including means affixed at a lower end to direct said water to a preselected destination;

support means projecting from said water collecting means for engaging an object to be watered for detachably fixing said water collecting means in a predetermined position above said destination;

strap means for encircling said water collecting means and said object to be watered;

camouflage means connected detachably with said water collecting means to render said water collecting means to appear to an observer as a different object; and said camouflage means including a picture of an object of a preselected item supported detachably by said water collecting means;

whereby said water collecting means is maintained in said predetermined position by said object to be watered.

2. An indoor watering device as defined by claim 1 wherein said picture has an opening through which said supply of water can be delivered to said water collecting means.

* * * * *